(12) United States Patent
Wetzel et al.

(10) Patent No.: US 11,729,611 B2
(45) Date of Patent: *Aug. 15, 2023

(54) SYSTEMS AND METHODS FOR POPULATING ONLINE APPLICATIONS USING THIRD PARTY PLATFORMS

(71) Applicant: Capital One Services, LLC, McLean, VA (US)

(72) Inventors: Christopher Wetzel, Wayne, PA (US); Dwij Trivedi, Oakton, VA (US); Robert Colenso, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,229

(22) Filed: Dec. 1, 2021

(65) Prior Publication Data

US 2022/0095103 A1   Mar. 24, 2022

Related U.S. Application Data

(63) Continuation of application No. 16/557,073, filed on Aug. 30, 2019, now Pat. No. 11,202,200, which is a continuation of application No. 16/155,112, filed on Oct. 9, 2018, now Pat. No. 10,489,504, which is a continuation of application No. 15/422,653, filed on Feb. 2, 2017, now Pat. No. 10,095,676, which is a continuation of application No. 14/608,417, filed on Jan. 29, 2015, now Pat. No. 9,602,949.

(Continued)

(51) Int. Cl.
*H04W 12/02* (2009.01)
*G06F 21/44* (2013.01)
(Continued)

(52) U.S. Cl.
CPC .......... *H04W 12/02* (2013.01); *G06F 21/445* (2013.01); *G06F 40/174* (2020.01);
(Continued)

(58) Field of Classification Search
CPC ....... H04W 12/02; H04W 4/50; H04W 12/06; H04W 12/088; H04W 4/20; G06F 21/445;
(Continued)

(56) References Cited

U.S. PATENT DOCUMENTS 9,292,484 B1 * 3/2016 Plow ................. G06F 40/143
2002/0133535 A1 * 9/2002 Lucovsky ........... G06F 21/6227
709/201

(Continued)

*Primary Examiner* — J. Brant Murphy
(74) *Attorney, Agent, or Firm* — Troutman Pepper Hamilton Sanders LLP; Christopher J. Forstner; John A. Morrissett

(57) ABSTRACT

A system and method includes a communication interface configured to transmit a web-based form to an applicant device and receive a selection of the third party to provide data to populate the plurality of fields of the web-based form and an application server that, in conjunction with the communication interface, is configured to perform various steps. It may, in response to receiving the selection, transmit a third-party API call to the selected third party. It may also transmit data indicative of an authentication request associated with the selected third party and receive data indicative of a validated authentication request. It may further request a set of data from the selected third party via the third party API and receive the requested set of data, which includes data for populating a specific data field on the web-based form.

20 Claims, 7 Drawing Sheets

Related U.S. Application Data

(60) Provisional application No. 61/933,136, filed on Jan. 29, 2014.

(51) Int. Cl.

| | | |
|---|---|---|
| *H04L 9/40* | (2022.01) | |
| *H04W 12/06* | (2021.01) | |
| *H04L 67/02* | (2022.01) | |
| *H04W 4/50* | (2018.01) | |
| *G06F 40/174* | (2020.01) | |
| *H04M 1/72445* | (2021.01) | |
| *H04W 12/088* | (2021.01) | |
| *H04L 67/53* | (2022.01) | |

(52) U.S. Cl.
 CPC .......... *H04L 63/0807* (2013.01); *H04L 67/02* (2013.01); *H04L 67/53* (2022.05); *H04M 1/72445* (2021.01); *H04W 4/50* (2018.02); *H04W 12/06* (2013.01); *H04W 12/088* (2021.01); *H04L 63/0815* (2013.01)

(58) Field of Classification Search
 CPC ... G06F 40/174; H04L 63/0807; H04L 67/02; H04L 67/53; H04L 63/0815; H04M 1/72445
 See application file for complete search history.

(56) References Cited

U.S. PATENT DOCUMENTS

| | | | | |
|---|---|---|---|---|
| 2010/0205079 | A1* | 8/2010 | Ferguson | G06F 16/958 715/764 |
| 2011/0145587 | A1* | 6/2011 | Park | G06F 21/316 713/182 |
| 2011/0265172 | A1* | 10/2011 | Sharma | H04L 63/0815 726/8 |
| 2012/0143958 | A1* | 6/2012 | Augustine | G06Q 10/10 709/205 |
| 2012/0297451 | A1* | 11/2012 | Ozzie | H04L 63/0884 709/204 |
| 2013/0054803 | A1* | 2/2013 | Shepard | G06F 21/6281 709/225 |
| 2013/0097517 | A1* | 4/2013 | Reiss | G06F 21/6218 715/741 |
| 2013/0109348 | A1* | 5/2013 | Sharma | H04W 12/084 455/411 |
| 2013/0325611 | A1* | 12/2013 | Delug | G06Q 30/0257 705/14.55 |
| 2014/0122988 | A1* | 5/2014 | Eigner | G06F 16/285 715/226 |
| 2014/0259135 | A1* | 9/2014 | Postrel | H04L 63/18 726/7 |
| 2014/0289118 | A1* | 9/2014 | Kassemi | G06Q 20/388 705/44 |
| 2015/0052036 | A1* | 2/2015 | Vernal | G06Q 40/00 705/35 |
| 2015/0052061 | A1* | 2/2015 | Anderson | G06Q 20/409 705/44 |
| 2015/0169749 | A1* | 6/2015 | Camelo | G06F 16/95 707/706 |
| 2015/0235215 | A1* | 8/2015 | Kumar | H04W 12/069 705/44 |
| 2015/0254746 | A1* | 9/2015 | Milne | G06Q 20/40 705/26.43 |
| 2015/0348015 | A1* | 12/2015 | Ren | G06Q 20/3229 705/41 |
| 2016/0142873 | A1* | 5/2016 | Trivedi | H04W 4/80 455/456.1 |

* cited by examiner

SYSTEMS AND METHODS FOR POPULATING ONLINE APPLICATIONS USING THIRD PARTY PLATFORMS

CROSS-REFERENCE TO RELATED APPLICATIONS

This application is a continuation of, and claims priority under 35 U.S.C. § 120 to, U.S. patent application Ser. No. 16/557,073, filed Aug. 30, 2019, which is a continuation of U.S. patent application Ser. No. 16/155,112, filed Oct. 9, 2018, now U.S. Pat. No. 10,489,504, which is a continuation of U.S. patent application Ser. No. 15/422,653, filed on Feb. 2, 2017, now U.S. Pat. No. 10,095,676, which is a continuation of U.S. patent application Ser. No. 14/608,417, filed on Jan. 29, 2015, now U.S. Pat. No. 9,602,949, which claims the benefit of U.S. Provisional Patent Application No. 61/933,136, filed on Jan. 29, 2014, the entire contents of each of which are incorporated herein by reference.

This application contains subject matter related to U.S. Provisional Patent Application No. 61/737,399 entitled "System and Method for Synching a Financial Account with a Social Network Account," filed on Dec. 14, 2012, the entire contents of which is incorporated herein by reference.

This application contains subject matter related to U.S. patent application Ser. No. 14/566,872, filed on Dec. 11, 2013, which claims the benefit of U.S. Provisional Patent Application No. 61/914,719, entitled "System and Method for Financial Transfers from a Financial Account Using social Media," filed on Dec. 11, 2014, the entire contents of each of which is incorporated herein by reference.

This application contains subject matter related to U.S. Provisional Patent Application No. U.S. Provisional Patent Application No. 61/789,858 entitled "System and Method for Fraud Management," filed on Mar. 15, 2013, the entire contents of which is incorporated herein by reference.

This application contains subject matter related to U.S. Pat. No. 7,857,212, entitled "Method and system for authorizing card account transactions by geographic region," the entire contents of which is incorporated herein by reference.

FIELD OF THE DISCLOSURE

The present disclosure relates to a system and method for populating online applications on a mobile device using data obtained from third party platforms based on authenticated communications between the applicant system and the third-party system.

BACKGROUND OF THE DISCLOSURE

Online applications require a user to enter data into various fields, such as name, address, telephone number, and the like. Entering data is not only time-consuming but also error-prone, especially when data entry occurs using a mobile device. Moreover, using current auto-fill methods to populate online forms requires storing the data to populate the fields on a device used to populate the online form.

These and other drawbacks exist.

SUMMARY OF THE DISCLOSURE

According to the various embodiments of the present disclosure, a system and method for populating online applications on a mobile device using data obtained from third party platforms based on authenticated communications between the applicant system and the third-party system may include using an application provider system to transmit data indicative of a web-based form, including a link to allow an end user to select a third party to provide data to populate a plurality of fields of the web-based form, receive a selection of a third party to provide data to populate a plurality of fields of the web-based form, in response to the selection, transmit a third-party application programming interface (API) call to the selected third party, transmit data indicative of an authentication request associated with the selected third party, receive a security token in response to a validated authentication request, the security token enabling communication between the application provider system and the third party system via the third party API, wherein the enabled communications is based on a set of permissions, each permission associated with a specific data field in the web-based form.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIGS. 6A-6E depict an example flow of screens illustrating a method for populating online applications using data obtained from third party platforms according to an embodiment of the disclosure.

DETAILED DESCRIPTION

The following description is intended to convey a thorough understanding of the embodiments described by providing a number of specific example embodiments and details involving system and method for populating online applications on a mobile device using data obtained from third party platforms based on authenticated communications between the applicant system and the third-party system. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A third party system, application provider system, and/or applicant device, and system supporting a connection between third party systems, application provider systems, and/or applicant devices, are used as examples for the disclosure. The disclosure is not intended to be limited to third party systems, application provider systems, and/or applicant devices only.

Figure 1:
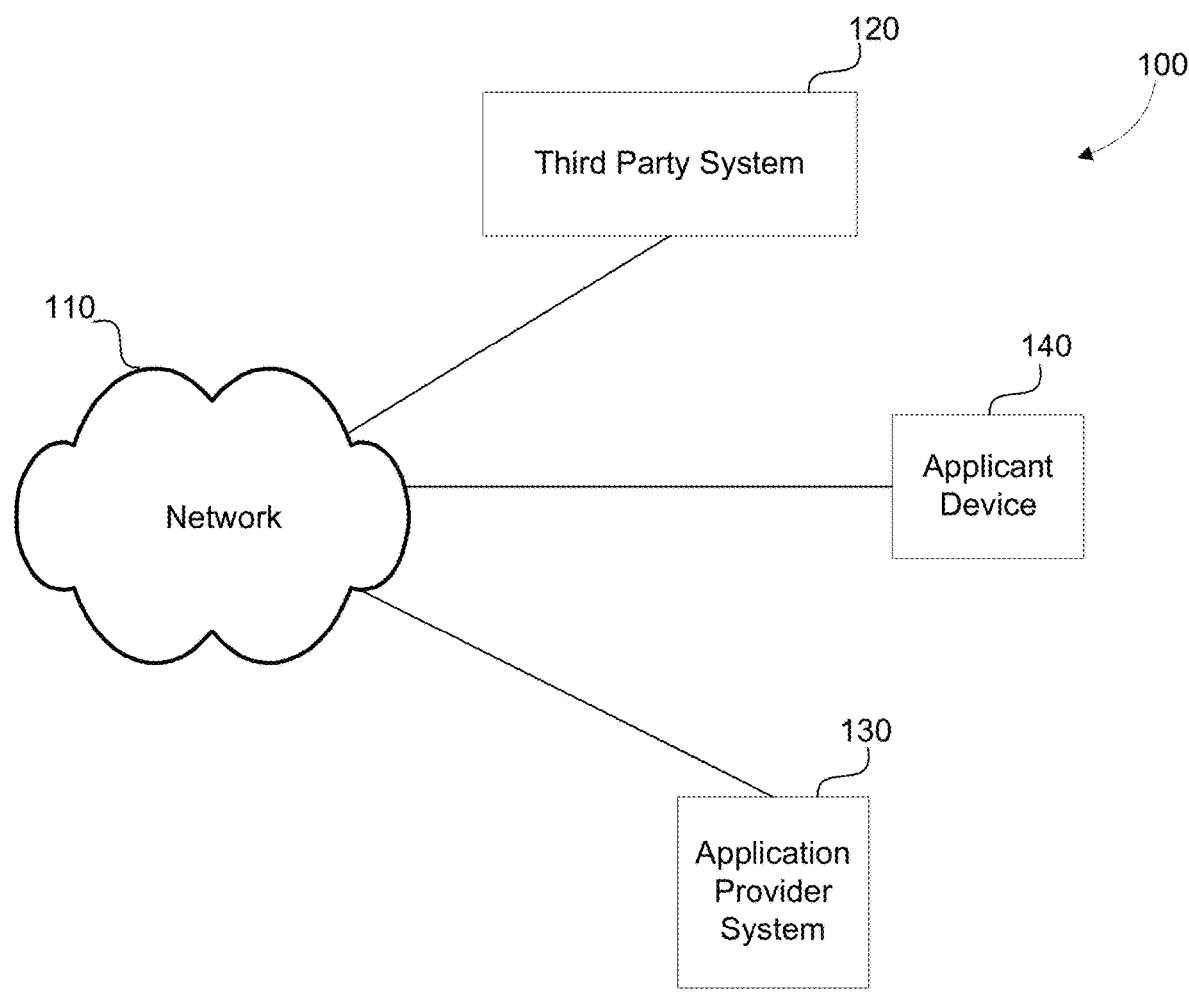
FIG. 1 depicts an example embodiment of a system for populating online applications using data obtained from third party platforms according to an embodiment of the disclosure.

The example embodiments disclosed herein are directed to systems and methods for populating online applications using data obtained from third party platforms, and the like. FIG. 1 illustrates an example system for populating online applications using data obtained from third party platforms 100. According to the various embodiments of the present disclosure, a system 100 for populating online applications using data obtained from third party platforms may include a third party system 120, an application provider system 130, and an applicant device 140 all connected over a network 110.

The network 110 may be one or more of a wireless network, a wired network, or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 110 may further include one network, or any number of example types of networks mentioned above, operating as a stand-alone network or in cooperation with each other. Network 110 may utilize one or more protocols of one or more network elements to which they are communicatively couples. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

According to the various embodiments of the present disclosure, third party system 120 may include, for example, a social media system, a utility provider system, a telecommunications provider system, and the like. A social media system may include a system associated with a social media provider, such as Facebook, Twitter, MySpace, Foursquare, Instagram, Google+, LinkedIn, and the like. A utility provider system may include an electric utility provider system, a gas provider system, a water provider system, cable and/or Internet service provider system, and the like. A telecommunication's provider system may include for example, a system associated with a phone company (e.g., Verizon, AT&T, Sprint, T-Mobile, MetroPCS, U.S. Cellular, Cricket, Virgin Mobile, Boost, CenturyLink, Frontier Communications, Comcast, Charter, Cox Communications, Time Warner, and the like), a cable or satellite service provider (Time Warner, Dish Network, Comcast, Cox Communications, Verizon, AT&T, DirecTV, and the like).

Each third party system 120 may maintain in, for example, one or more databases, subscriber accounts holding account data, such as, for example, subscriber name, subscriber phone number, subscriber address, subscriber occupation, subscriber employment data (e.g., income, full-time/part-time/self-employment status, year(s)/month(s) occupied by current employer, previous employer data), subscriber social security number, subscriber date of birth, subscriber property data (e.g., whether the subscriber rents or buys, monthly mortgage, monthly rent, and the like), and/or subscriber location data. Subscriber location data may include location data received from a subscriber device, such as location data received via GPS, stored address data, subscriber-submitted address data, location data received using magnetic field calculations, location data derived from IP address data, and the like. Subscriber location data may include location data stored with the subscriber account. For example, a subscriber may use a mobile application on a mobile device, for example, to "check in" to a location and the third party system associated with that check-in data may store that location data and associate it with the subscriber. A subscriber may transmit location data, including a mailing or billing address, to the third party system for storage.

According to the various embodiments of the present disclosure, an application provider system 130 may include, for example, a financial institution system, an employment provider system, a housing provider system, and the like. An application provider system may include any system that requires an applicant to fill out an application in order to apply, order, and/or access data using the application system 130.

A third party may access network 110 through one or more third party systems 120 that may be communicatively coupled to the network 110. One or more application providers may access the network 110 through one or more application provider systems 130 that also may be communicatively coupled to the network 110. Additionally, one or more applicants may be communicatively coupled to the network 110 through an applicant device 140. Although third party system 120, application provider system 130, and applicant device 140 are depicted as a single systems and/or devices, it should be appreciated that third party system 120, application provider system 130, and/or applicant device 140 may comprise a plurality of systems and/or devices.

Figure 4:
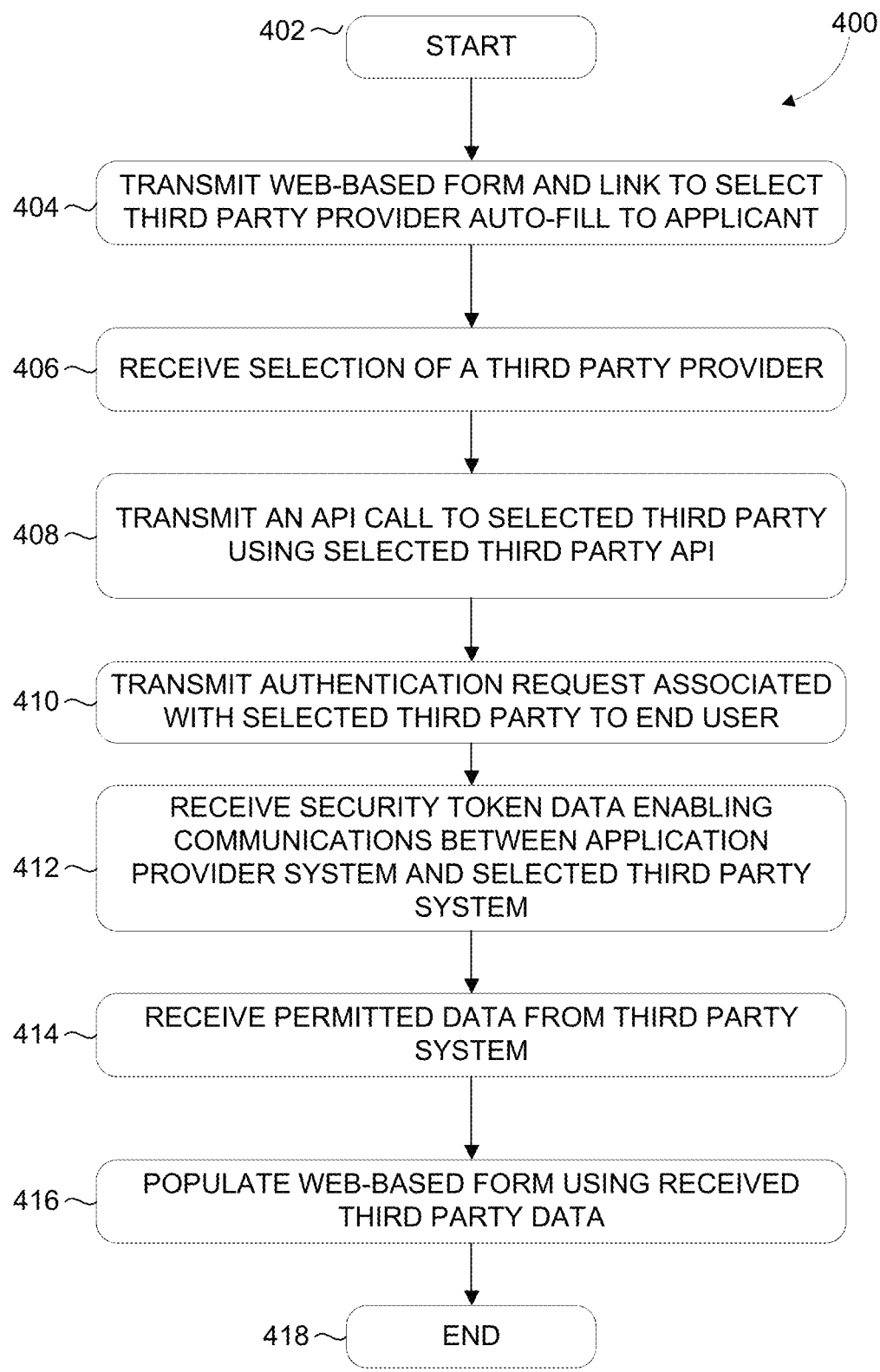
FIG. 4 depicts an example flow chart illustrating a method for populating online applications using data obtained from third party platforms according to an embodiment of the disclosure.

An example third party system 120, application provider system 130, and/or applicant device 140 may include one or more network-enabled computers to process instructions for populating online applications using data obtained from third party platforms (e.g., method 400 in FIG. 4). As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 100 may execute one or more software applications for using account rewards to make a charitable donation.

The third party system 120, application provider system 130, and/or applicant device 140 may further include, for example, a processor, which may be several processors, a single processor, or a single device having multiple processors. The third party system 120, application provider system 130, and/or applicant device 140 may access and be communicatively coupled to the network 110. The third party system 120, application provider system 130, and/or applicant device 140 may store information in various electronic storage media, such as, for example, a database and/or other data storage (not shown). Electronic information may be stored in the third party system 120, application provider system 130, and/or applicant device 140 in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

The third party system 120, application provider system 130, and/or applicant device 140 may send and receive data using one or more protocols. For example, data may be transmitted and received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiples Access (CDMA) based systems suitable for transmitting and receiving data. Data may be transmitted and received wirelessly or may utilize cabled network connections or telecom connections, fiber connections, traditional phone wireline connection, a cable connection, or other wired network connection.

Each third party system 120, application provider system 130, and/or applicant device 140 of FIG. 1 also may be equipped with physical media, such as, but not limited to, a compact disc (CD), a digital versatile disc (DVD), a floppy disk, a hard drive, read only memory (ROM), random access memory (RAM), as well as other physical media capable of storing software, or combinations thereof. Third party system 120, application provider system 130, and/or applicant device 140 may be able to perform the functions associated with methods for populating online applications using data obtained from third party platforms 400. Third party system 120, application provider system 130, and/or applicant device 140 may, for example, house the software for methods for populating online applications using data obtained from third party platforms 400, obviating the need for a separate device on the network 110 to run the methods housed third party system 120, application provider system 130, and/or applicant device 140.

Furthermore, the information stored in a database may be available over the network 110, with the network containing data storage. A database housed in third party system 120, application provider system 130, and/or applicant device 140 or the network 110, may store, or may connect to external data warehouses that stores, account data, current account holder data, and/or potential account holder data.

Applicant device 140 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/ or any other smartphone or like wearable mobile device. Applicant device 140 also may include a handheld PC, a phone, a smartphone, a PDA, a tablet computer, or other device. Applicant device 140 may include device-to-device communication abilities, such as, for example, RFID transmitters and receivers, cameras, scanners, and/or Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). For example, applicant device 140 may be configured using the Isis Mobile Wallet™ system, which is incorporated herein by reference. Other exemplary NFC standards include those created by the NFC Forum.

Applicant device 140 may include one or more software applications, such as a communication application and/or a financial institution application. A communication application may be a software application that enables applicant device 140 to receive and display communications received from a financial institution 120, whether or not the user device is associated with an account held at financial institution 120. For example, a communications application may allow applicant device 140 to securely exchange data with a financial institution 120 over network 110. A financial institution application may include, for example, a mobile banking application, which may be a software application that, among other features, enables applicant device 140 to transmit and receive data associated with a financial account held with an associated financial institution. In various embodiments, the mobile banking application may be a native application executing on a mobile device. The mobile banking application also may be a mobile optimized web site associated with the financial institution.

According to the various embodiments of the present disclosure, a system and for populating online applications using data obtained from third party platforms 100 may further include linking a third party account held with a third party system 120 (e.g., a social media system) to an account held at an application provider system 130 (e.g., a financial institution). U.S. Provisional Patent Application No. 61/737,399 entitled "System and Method for Synching a Financial Account with a Social Network Account," and U.S. patent application Ser. No. 14/566,872, filed on Dec. 11, 2013, which claims the benefit of U.S. Provisional Patent Application No. 61/914,719, entitled "System and Method for Financial Transfers from a Financial Account Using social Media," each disclose systems and methods relating to using third party systems, such as social media systems to provide data to an application provider system, such as a financial system, the contents of which are incorporated by reference in their entirety.

The account provider system may include a fraud detection module that operates various fraud detection algorithms. For example, a fraud detection algorithm may take into consideration a number of variables including, for example, sending account holder data, sending subscriber data, recipient account holder data, recipient subscriber data, time of day, transfer amount, and/or social media preference data. Each of these variables may be user-defined, defined by the account provider system, and/or defined by the social media system. For example, a subscriber may define recipients that are authorized to receive a funds transfer from the subscriber, such as a listing of social media connections. In another example, the account provider system may define transfer amounts where account holder may select a one of the account provider-defined amounts. U.S. Provisional Patent Application No. 61/789,858 entitled "System and Method for Fraud Management," discloses further fraud management methods, the contents of which are incorporated by reference in their entirety. Additionally, U.S. Pat. No. 7,857,212, entitled "Method and system for authorizing card account transactions by geographic region," discloses fraud prevention using authorizations by geographic region, the contents of which are incorporated by reference in their entirety.

Figure 2:
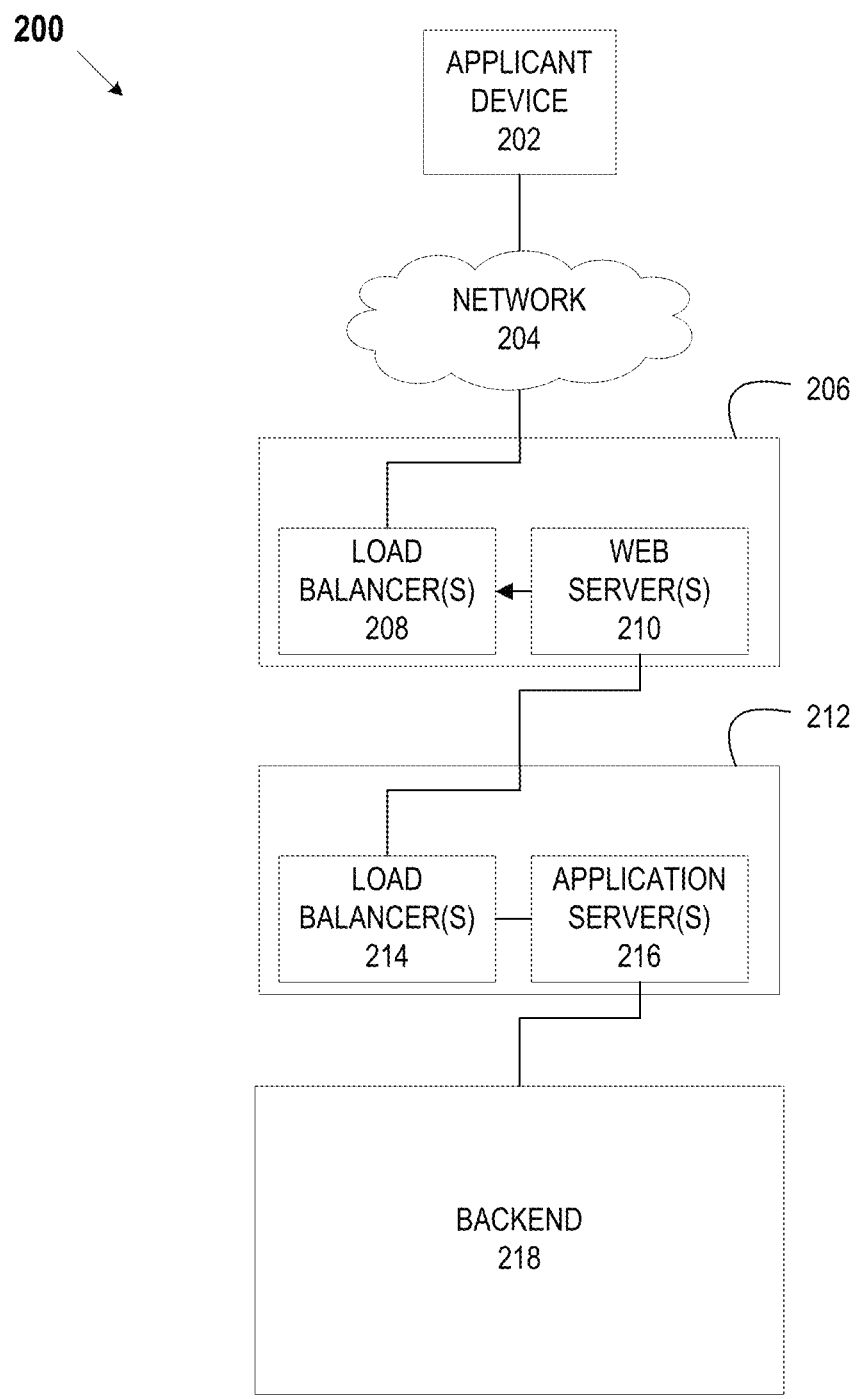
FIG. 2 depicts an example embodiment of a system for populating online applications using data obtained from third party platforms according to an embodiment of the disclosure.

Referring to FIG. 2, which depicts an example system 200 that may enable a financial institution, for example, to provide network services to its customers. For example, system 200 may enable an applicant device (e.g., applicant device 140) to interact with an application provider system (e.g., application provider system 130). System 200 also may enable an application provider system (e.g., application provider system 130) to interact with a third party system (e.g., third party system 120). Financial institution system components of FIG. 2 may be components of application provider system 130. As shown in FIG. 2, system 200 may include an applicant device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Applicant device 202 may be a network-enabled computer, similar to applicant device 140: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Applicant device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 318. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, applicant device 202, connect to access various services of a financial institution, for example. Load balancer(s) 208 may forward requests to one of the application servers 216 and/or backend 218 servers, which may then reply to load balancer 208. This may allow load balancer(s) 208 to reply to applicant device 202 without applicant device 202 ever knowing about the internal separation of functions. It also may prevent applicant devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., applicant device 202) through a network (e.g., network 204), such as the Internet. In various examples, web servers, may deliver web pages, relating to, for example, online banking applications and the like, to clients (e.g., applicant device 202). Web server(s) 210 may use, for example, a hypertext transfer protocol (HTTP or sHTTP) to communicate with applicant device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 318. Web server(s) 210 also may enable or facilitate receiving content from applicant device 202 so applicant device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 318 on one side, and, connections to the Web client (e.g., applicant device 202) on the other.

Backend 218 may include hardware and/or software that enable the backend services of, for example, a financial institution or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 also may be associated with an application provider system (e.g., application provider system 130) and/or a third party system (e.g., third party system 120).

Figure 3:
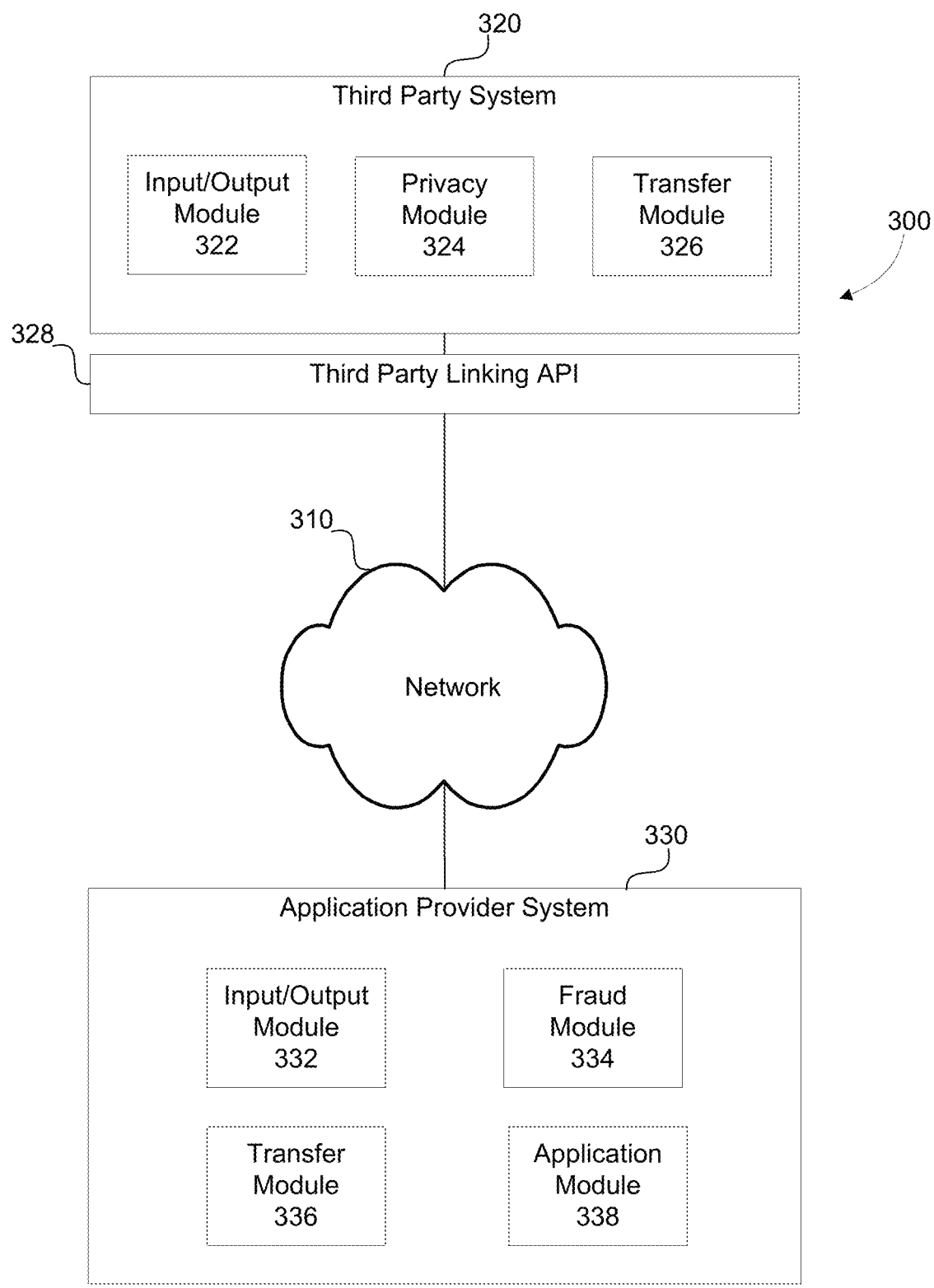
FIG. 3 depicts an example embodiment of system components for populating online applications using data obtained from third party platforms according to an embodiment of the disclosure.

FIG. 3 illustrates various modules used in, for example, a third party system 320, which may be similar to third party system 120, and an application provider system 330, which may be similar to account provider system 130. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

Third party system 320 may include an input/output module 322 and a privacy module 324. The input/output module 322 may include various hardware and software components, such as, for example, a repeater, a microwave antenna, a cellular tower, or another network access device capable of providing connectivity between network mediums. The input/output module 322 may be capable of sending or receiving signals via network 310. Moreover, the input/output module 322 may provide connectivity to one or more wired networks and may be capable of receiving signals on one medium such as a wired network and transmitting the received signals on a second medium such as a wireless network.

Privacy module 324 may include various hardware and software components, such as for example, data storage and at least one processor, capable of providing privacy features associated with a third party system 320. Privacy module 324 also may provide functionality associated with requiring approval for data sharing features available using third party system 320 so that only approved data is made available via third party system 320. For example, privacy module 324 may provide the functionality to allow a third party user to select and pre-approve the sharing of certain data held within data fields of the third party system (e.g., name, address, phone number, e-mail address, and the like).

Transfer module 326 may include various hardware and software components, such as for example, data storage and at least one processor, capable of facilitating the transfer of data from third party system 320 to application provider system 330. For example, transfer module 326 may receive an authentication request, provide authentication e.g., (as described herein), and generate and transmit a security token in order to communicate with an application provider system 330. The transfer module 326 may utilize, for example, a third party linking API 328 to contact an application provider system 330 and enable communications between the third party system 320 and application provider system 330.

Third party linking API 328 may allow certain data to be transmitted through the API so that a third party system 320 may communicate with an application provider system 330. For example, API 328 may allow communications using an agreed upon protocol and specifications, such as, for example, XML based communication, JSON based communications, and the like.

The third party linking API 328 may prevent data other than approved data to be transmitted through the API 328. For example, the API 328 may support transmission of only the subscriber name, subscriber e-mail address, and the like to be transmitted from the third party system 320 to the application provider system 330.

A third party linking API 328 may provide encryption and filtering functionality to prevent, for example, identity theft and fraudulent transmission of data. For example, the third party linking API 328 may filter out information that is unnecessary to carry out the claimed methods. A third party inking API 328 may also encrypt, for example, identification information, to ensure that any data passed between the systems is secure during transmission and storage.

Application provider system 330 may include an input/output module 332, a fraud module 334, a transfer module 336, and a confirmation module 338. The input/output module 332 may include various hardware and software components, such as, for example, a repeater, a microwave antenna, a cellular tower, or another network access device capable of providing connectivity between network mediums. The input/output module 332 may be capable of sending or receiving signals via network 310. Moreover, the input/output module 332 may provide connectivity to one or more wired networks and may be capable of receiving signals on one medium such as a wired network and transmitting the received signals on a second medium such as a wireless network.

Fraud module 334 may include various hardware and software components, including data storage and at least one processor, to detect any fraudulent received data. Fraud module 334 may access a third party linking API 328 in order to request and/or receive data from third party system 320. For example, fraud module 334 may request applicant data from a third party system 320 related to an application. Application provider systems 330 are not required to store third party data, but instead may access third party data once authorized (via a secure token) to do so. Fraud module 334 may perform a fraud analysis using fraud detection algorithms. For example, fraud detection algorithms may take into consideration a fraud rating associated with any application data received from third party system 320. For example, where a received name, social security number, phone number, or other data, indicates that the applicant has previous or pending fraud charges again his or her, fraud module 334 may transmit an alert to the application provider system and the applicant may be required to contact the application provider before continuing.

Transfer module 336 may include various hardware and software components, such as data storage and at least one processor, to facilitate the transfer of data from a third party system 320 to an application provider system 330 using a social linking API 328. For example, transfer module 336 may transmit a request obtain data from an applicant using an applicant device to third party system 320. This request may be transmitted via network 310 to third party system 320 via a social linking API 328. Third party system 320 may transmit an authentication request (e.g., an authentication window) to the applicant device in response to receiving the request. Once authenticated, the third party system 320 may transmit a security token to the application provider system 330 to allow the transfer of data between the third party system 320 and the application provider system 330 using the transfer module 336. Transfer module may extract, transform, and/or load the data received from the third party system 320 to incorporate the received data into an application housed at the application provider system 330.

Application module 338 may include various hardware and software components to perform methods for preparing and/or processing an application. Application module 338 may store partially finished application, process applications, and/or submit applications as described herein.

FIG. 4 illustrates a method for populating online applications using data obtained from third party platforms 400. The method 400 may begin at block 402. At block 404, an application provider system may transmit a web-based form to an applicant device. In an example embodiment, the application provider system may transmit a web-based form to a mobile device of an applicant. The web-based form may include a link or other interface mechanism (e.g., a button and the like) to select a third party provider to automatically fill in various data fields in the application. For example, the web-based form may include a button, link, and/or like interface mechanism that allows an applicant to auto-fill the web-form using third-party data as described herein, as is illustrated in, for example, FIG. 5. At block 406, an application provider system may receive a selection of a third party provider from the applicant device. The selection of a third party provider indicates that the applicant desires to have the selected third party provide various data to the application provider in order to populate various fields in the application. Because the applicant is requesting data from a third party system, it is not required that any of the data be stored on the applicant device, or with a device associated with the applicant or the device provider (e.g., Apple, Samsung, and the like).

At block 408, the application provider system may transmit an API call or similar signal to the selected third party system using a third party API, for example. In this manner, the third party may control what information may be requested and/or transmitted using the third party API. The third party system associated with the selected third party may then transmit an authentication request to the applicant at block 410. The third party system may transmit the authentication request through the application provider. An authentication request may, for example, request that an applicant log into an account associated with the selected third party, provide a username, provide a password, answer security questions, and/or provide biometric data for authentication. The third party system may include a notification and/or the opportunity for an applicant to select data stored at the third party system to be shared to the application provider system.

Once an applicant is authenticated, the selected third party system may transmit a security token to the application provider system in block 412. Once an application provider system receives security token data, the application provider system may be able to communicate with the third party system in order to receive data from the third party system. The application provider system may request certain data fields (e.g., name, address, phone number, e-mail address, and the like) in order to populate an application for the applicant. As another example, the applicant device may transmit a request for a specific field, such as a location, to be populated to the application provider system. Accordingly, the application provider system may transmit a request to populate a specific field with data from the third party system.

In response to any request for data, the third party system may transmit permitted data to the application provider system via an API. Permitted data may include, for example, data fields associated with the data fields provided in a notification and/or data selected by the applicant when the applicant authenticated himself or herself. In this manner, a specific set of data may be transmitted from the third party system to the application provider system. Moreover, the third party system and/or the applicant may decide what data may be included in the specific set of data shared.

In block 414, the application provider system may receive data from the third party system. It should be noted that all communications between the third party system and the application provider system may be transmitted using a third party linking API. In block 416, one the application provider system receives data from the third party system relating to the application, the application provider system may populate an application for the applicant using the received data. The method may end at block 418.

Once each field in the application is filled, either by the methods described herein using data received from a third party system and/or applicant device or manually by the applicant using an applicant device, the application may be submitted using the application provider system. Once submitted, the application may be approved or denied. Where an applicant does not complete an application and exits the application process, the application provider system and/or the third party system may store application specific data and associate the application specific data with the applicant. For example, the application provider system and/or the third party system may store, either locally or remotely, application data associated with fields of the application that were previously entered using the systems and methods described herein. When an applicant using an applicant device desires to complete the application, the applicant may log into the application provider system and/or third party system using log in credentials that may be authenticated as described herein. Upon submitting the appropriate log in credentials, the application provider system and/or third party system may transmit data indicative of previously entered application data (e.g., name, address, phone number, and the like) to the applicant device where it may be displayed as an application. Additionally, where an applicant has an incomplete application stored with an application provider system and/or a third party system, the application provider system and/or third party system may transmit data indicative of an alert to the applicant device. An alert may include application data, such as application type, application number, application name, application status, application date, and the like. The alert may also include a link to direct the applicant using the applicant device to the stored application in order to complete the application process.

Figure 5:
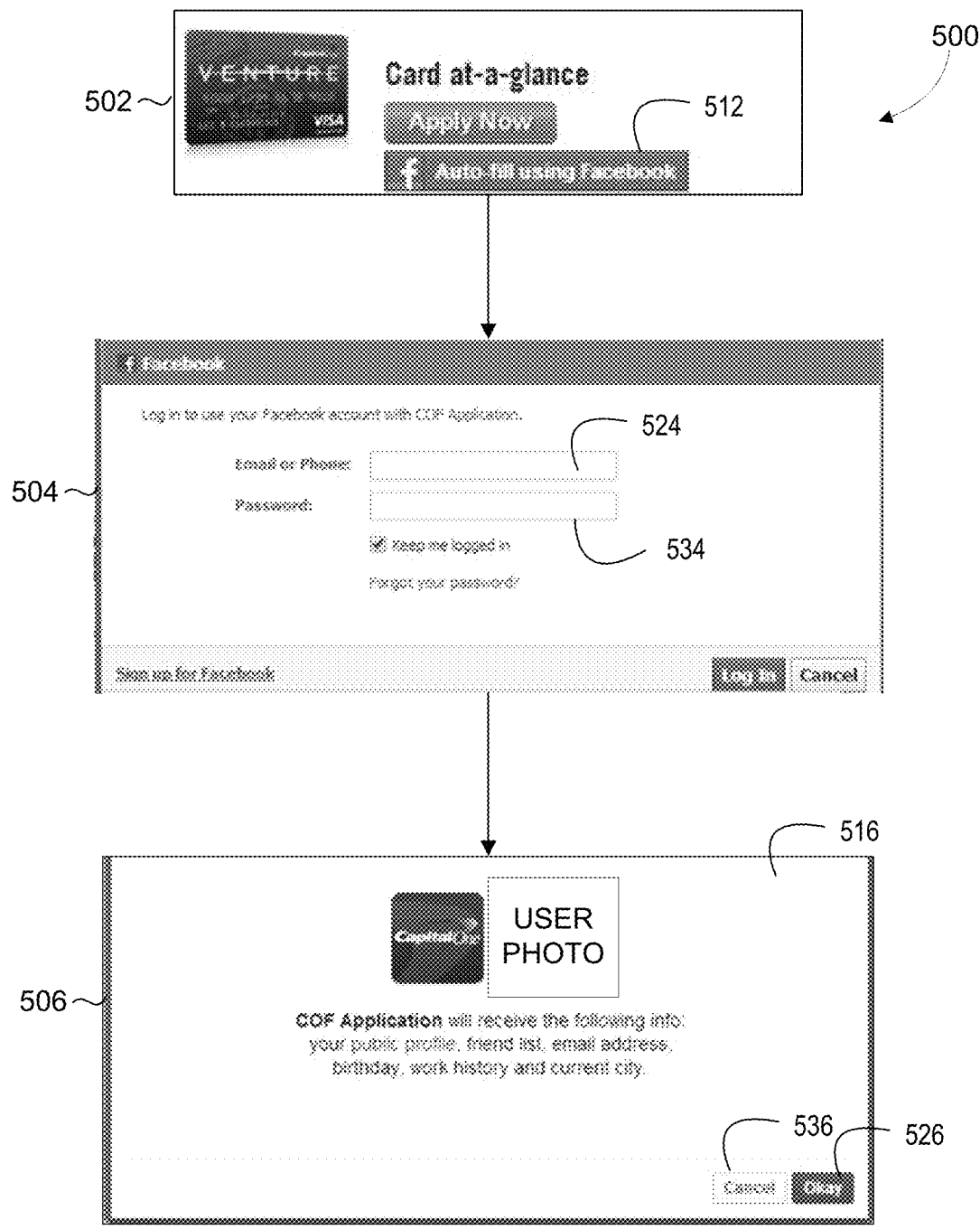
FIG. 5 depicts an example flow of screens illustrating a method for populating online applications using data obtained from third party platforms according to an embodiment of the disclosure.

FIG. 5 illustrates an example interface and method for populating online applications using data obtained from third party platforms 500. For example, FIG. 5 illustrates example interface screen shots used between a third party system, such as Facebook, and an application provider system, such as Capital One. In block 502, an example screen shot of transmitted data indicative of the start of an application and a selection to auto-fill the application is presented. An applicant may then select the auto-fill button 512 in order to have the third party system, Facebook, automatically fill in data field of an application. In block 504, an example screen shot 514 of transmitted data indicative of authentication between an applicant and a third party system (e.g., Facebook) is presented for an applicant to fill-in. This screen shot 514 may be presented once an applicant clicks on the auto-fill button presented in block 502. The screenshot 514 may request, for example, applicant login credentials (e.g., email 524 and password 524) for the third party system. In block 506, an example screen shot 516 of transmitted data indicative of data to be shared between third party system (e.g., Facebook) and application provider system (e.g., Capital One) is presented. If the applicant agrees to share the data presented, the applicant may click Okay button 526. Otherwise, the applicant may click Cancel button 536.

Figures 6A, 6B, 6C:
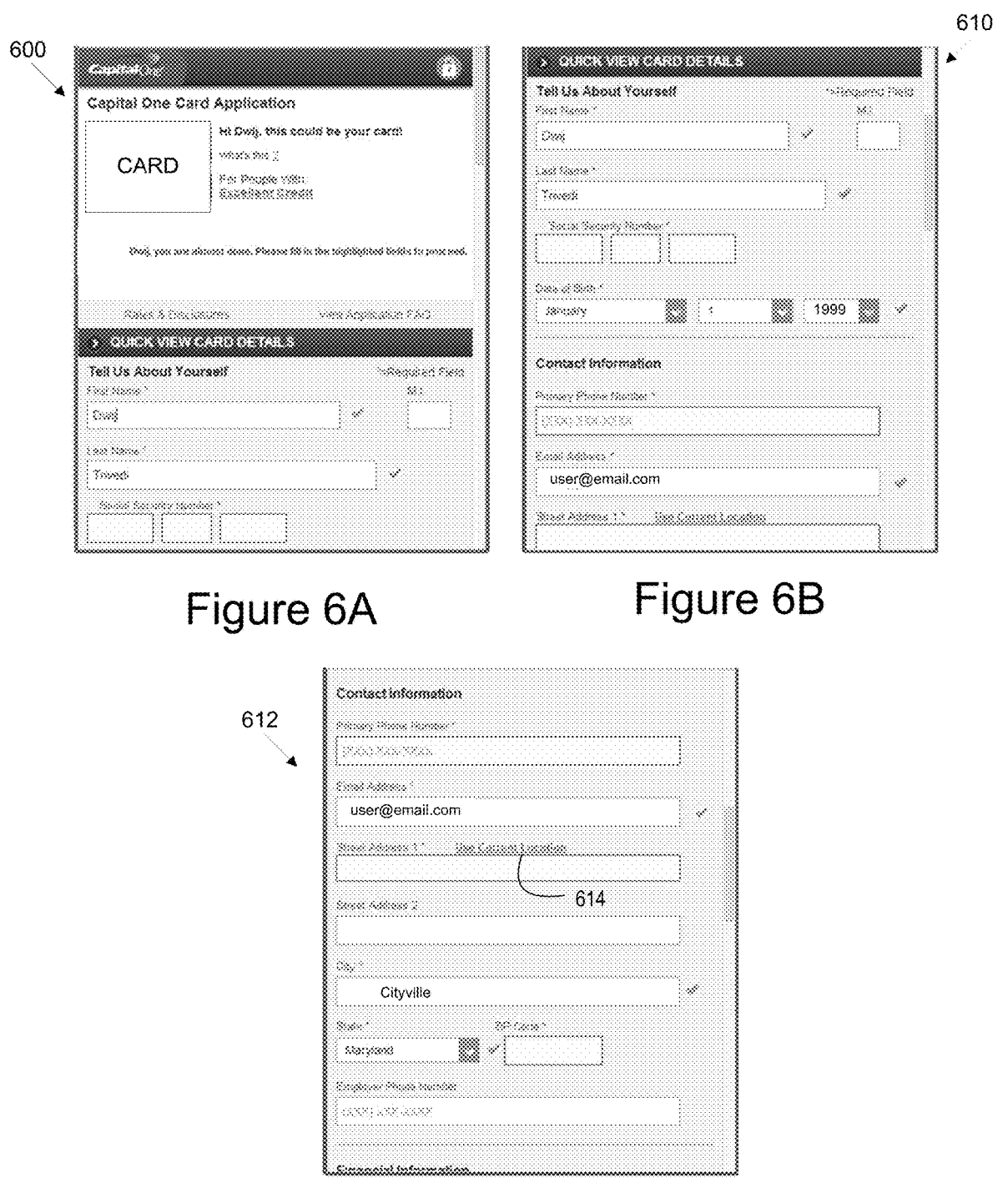
Figures 6D, 6E:
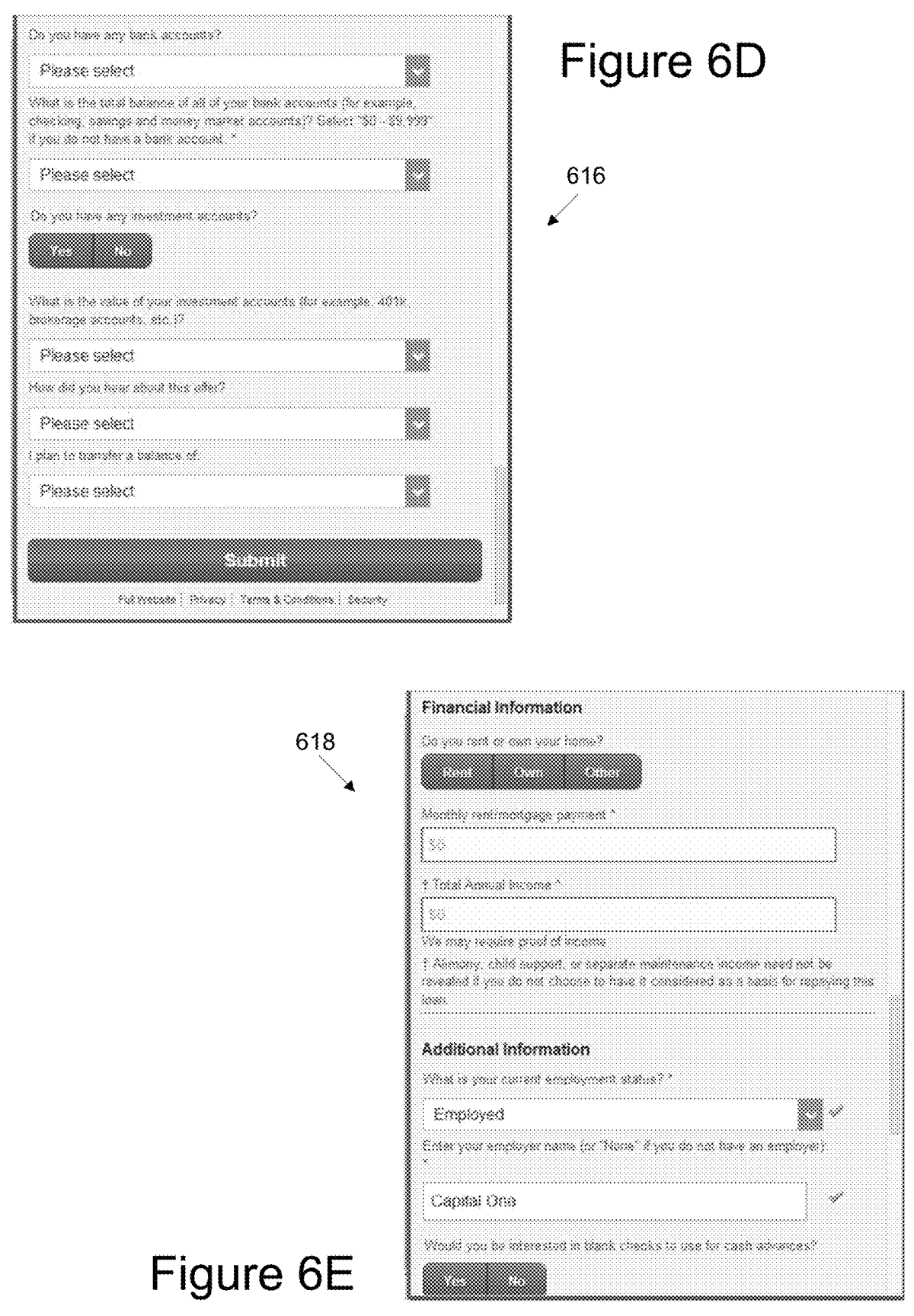

FIGS. 6A through 6E illustrate example screen shots of an online application provided by an application provider system. FIG. 6A illustrates example screen shot 600 which depicts an example card application initial screen. FIG. 6B illustrates example screen shot 610 which depicts an example view card application details screen. FIG. 6C illustrates example screen shot 612 which depicts an example contact information screen. FIG. 6D illustrates example screen shot 616 which depicts an example account details screen. FIG. 6E illustrates example screen shot 618 which depicts an example view financial information details screen. In the example online application of FIGS. 6A through 6E, various application fields have been filled using the methods described herein. In FIGS. 6A-6E, the fields marked with a check mark have been auto-populated by the third party system. In various embodiments, the applicant can manually fill or populate the fields that have not been auto-populated. For example, the fields filled in by a third party are marked with a white background. Other markers may be applied. Fields not filled in by third party systems may be marked as well. For example, the fields not filled in by a third party are marked with a red border and a yellow background. Other markers may be used. Moreover, fields filled in by the applicant himself or herself may be marked as well (not show).

As illustrated in FIG. 6C, a user may request for a specific field to be populated (e.g., address data using the "Use Current Location" link 614). For example, address data may be received from the third party system and/or the applicant device. When address data is received from an applicant device, the application provider system may transmit a request to the applicant device, where the request is a request for location data. An applicant device may transmit a response including location data obtained via GPS, magnetic field data, IP address data, saved location data, and/or other data indicative of location. As an example, where a third party system has not populated a field, data may be transmitted from the application provider system indicative of a link, where the link allows the applicant to select for the applicant device to provide the specific data. The specific data may be pre-stored in an applicant device, such as a telephone number, address, name, birthdate, e-mail address, and the like. Accordingly, the application provider system may populate fields with data received from a third party system and/or an applicant device.

When address data is received from a third party system, the application provider system may transmit a request to the third party system via the API, where the request is a request for, as an example, location data. A request may be for any data required for an application that may be stored in the applicant device. A third party system may then transmit a request to the applicant device for location data, similar to the application provider system transmitting a request to the applicant device, and the response may be relayed back to the application provider system through the third party system via the API. A third party system also may respond to an application provider request for location data with stored location data associated with the application. For example, the third party may have recent location data stored from when a user has, for example, "checked in" at a location, when the application/subscriber agrees to have the third party system pull location data at regular intervals from the applicant device, and/or when the applicant/subscriber provides location data to the third party system in any other manner. Accordingly, a specific field, such as a location and/or address field, may be populated using the system 100.

It should be appreciated that the foregoing discussion related to FIGS. 1 through 6E is illustrative only, and that the various embodiments of the disclosure may be implemented by any other appropriate system or method.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system, comprising:
a communication interface configured to transmit a web-based form to a device of a user and receive an input indicative of an applicant selection for a third party system to provide data to populate a plurality of fields of the web-based form; and
an application server, that, in conjunction with the communication interface, is configured to:
transmit, responsive to receiving the input via the communication interface, a call, using an application programming interface (API), to the selected third party system;
request a set of data from the selected third party system via the API;
receive the requested set of data via the API, the requested set of data comprising data for populating a specific data field of the web-based form;
transmit the received set of data in the web-based form to the device thereby causing the device to auto-populate the respective data field and display the auto-populated data field on a user interface of the device, and
wherein the user interface is a mobile-optimized web browser interface.

2. The system of claim 1, wherein the web-based form further comprises a data field that is to be populated manually by the user.

3. The system of claim 1, wherein the third party system is associated with the API and comprises a social network.

4. The system of claim 3, wherein the third party system comprises a privacy module configured to transmit a security token via the API.

5. The system of claim 3, wherein the application server and the third party system each comprise a transfer module configured to enable data transfer between the application server and the third party system.

6. The system of claim 1, wherein the application server, that, in conjunction with the communication interface, is further configured to:
transmit data indicative of an authentication request associated with the selected third party system; and
receive data indicative of a validated authentication request.

7. The system of claim 6, wherein the received data indicative of the validated authentication request comprises a security token configured to enable communication between the application server and the selected third party system via the API.

8. The system of claim 1, wherein the user interface of the device is configured to prompt the user to select the selected third party system.

9. The system of claim 1, wherein the web-based form comprises a link to select the third party system.

10. The system of claim 1, wherein the web-based form comprises an interface mechanism to select the third party system.

11. A method by an application server comprising the steps of:
transmitting a web-based form to a device of a user;
receiving, from the device, an input indicative of an applicant selection for a third party system to provide data to populate a plurality of fields of the web-based form;
transmitting, responsive to receiving the input, a call, using an application programming interface (API), to the selected third party system;
transmitting data indicative of an authentication request associated with the selected third party system;
receiving data indicative of a validated authentication request;
requesting a set of data from the selected third party system via the API; and
receiving, via the API, the requested set of data comprising data for populating a specific data field of the web-based form, and
wherein the received data indicative of the validated authentication request comprises a security token configured to enable communication between the application server and the selected third party system via the API.

12. The method of claim 11 further comprising:
associating the received set of data with a respective data field in the web-based form; and
transmitting the associated data with the respective data field in the web-based form to the device, thereby causing the device to auto-populate the respective data field and display the auto-populated data field on a user interface of the device.

13. The method of claim 12 further comprising causing the user interface of the device to prompt the user to select the third party system.

14. The method of claim 11, wherein the web-based form further comprises a data field that is to be populated manually by the user.

15. A system comprising:
one or more processors; and
a memory in communication with the one or more processors and storing instructions that, when executed by the one or more processors, are configured to cause the system to:
receive an input indicative of a selection by a user of a third party to provide data to populate a plurality of fields of a web-based form;
request a set of data from the third party;
receive the requested set of data, the requested set of data comprising data for populating a specific data field of the web-based form;
transmit the requested set of data with the respective data field in the web-based form to a device of the user, thereby causing the device to auto-populate the respective data field and display the auto-populated data field on a user interface of the device, and
wherein the user interface comprises a mobile optimized web browser interface.

16. The system of claim 15, wherein the instructions, when executed by the one or more processors, are further configured to cause the system to:
transmit the web-based form to the device; and
transmit, responsive to receiving the input, a call, using an application programming interface (API), to the third party.

17. The system of claim 16, wherein the instructions, when executed by the one or more processors, are further configured to cause the system to:
transmit data indicative of an authentication request associated with the third party; and receive a security token in response to a validated authentication request, the security token being configured to enable communication between the one or more processors and the third party via the first API.

18. The system of claim 15, wherein the instructions, when executed by the one or more processors, are further configured to cause the system to:
   store the web-based form in a database; and
   cause the user interface of the device to prompt the user to select the third party.

19. The system of claim 15, wherein the web-based form comprises a link to select the third party system.

20. The system of claim 15, wherein the web-based form comprises an interface mechanism to select the third party system.

* * * * *